United States Patent
Green et al.

(10) Patent No.: US 7,045,588 B2
(45) Date of Patent: *May 16, 2006

(54) POLYESTER RESIN COMPOSITION FOR USE IN A COATING COMPOSITION AND METHOD OF PREPARING THE SAME

(75) Inventors: Marvin L. Green, Brighton, MI (US); Swaminathan Ramesh, Canton, MI (US)

(73) Assignee: BASF Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/777,698

(22) Filed: Feb. 12, 2004

(65) Prior Publication Data

US 2005/0182231 A1    Aug. 18, 2005

(51) Int. Cl.
*C08G 63/02* (2006.01)
(52) U.S. Cl. .................. 528/272; 428/411.1; 428/400; 428/426; 428/447; 528/271
(58) Field of Classification Search ............. 428/411.1, 428/400, 426, 447; 528/271, 272
See application file for complete search history.

(56) References Cited

U.S. PATENT DOCUMENTS

| 5,593,785 | A | * | 1/1997 | Mayo et al. .............. 428/423.1 |
|---|---|---|---|---|
| 6,294,619 | B1 | * | 9/2001 | Chasser et al. ............. 525/440 |
| 6,319,311 | B1 | * | 11/2001 | Katz et al. ............. 106/287.11 |
| 6,375,789 | B1 | | 4/2002 | Katz et al. |
| 6,437,071 | B1 | | 8/2002 | Odaka et al. |
| 6,451,930 | B1 | | 9/2002 | Burgman et al. |
| 6,602,964 | B1 | | 8/2003 | Huang et al. |
| 2003/0050432 | A1 | * | 3/2003 | Ramesh et al. ............. 528/354 |
| 2004/0235997 | A1 | * | 11/2004 | Meisenburg et al. ........ 524/431 |

* cited by examiner

*Primary Examiner*—Terressa Boykin

(57) ABSTRACT

A polyester polycarbamate resin composition for use in coating compositions to produce films having improved scratch and mar characteristics. The resin composition is the reaction product of a first compound having a plurality of hydroxyl groups with a carbamate compound reactive with the hydroxyl groups of the first compound and added in an amount sufficient to form a carbamated intermediary. The carbamated intermediary has at least one primary carbamate group available for cross-linking and has unreacted hydroxyl groups. Then, a silyl compound having a terminal isocyanate group is reacted with the unreacted hydroxyl groups of the carbamated intermediary. The silyl compound also has silylalkoxy groups available for secondary cross-linking. The present invention is also directed to a method of preparing the resin composition.

42 Claims, No Drawings

POLYESTER RESIN COMPOSITION FOR USE IN A COATING COMPOSITION AND METHOD OF PREPARING THE SAME

FIELD OF THE INVENTION

The subject invention generally relates to a polyester resin composition utilized in coating compositions. More specifically, the subject invention relates to a polyester resin composition having increased cross-linking capability for use in a clear coat and a method of preparing the polyester resin composition.

BACKGROUND OF THE INVENTION

Various resin compositions are known for use in coating compositions that include silyl compounds and carbamate compounds. Typically, the resin compositions include a first compound having a plurality of hydroxyl groups, such as a diol or a polyester or polyether polyol. Examples of such compositions are disclosed in U.S. Pat. Nos. 6,602,964; 6,375,789; and 6,319,311. These patents disclose a resin composition formed from a silane carbamate compound. To form the silane carbamate compound, a silyl compound is reacted with diol, which forms the carbamate group with an isocyanate group of the silyl compound. However, for this reaction to proceed, the conditions must be precisely controlled and certain catalysts are used to ensure the formation of the silane carbamate compound. None of these resin compositions include a first compound having carbamate functionality and silyl functionality separate from the carbamate functionality, since the silyl compound and the carbamate compound are reacted to form the silane carbamate compound, prior to reaction with the first compound. Therefore, there are no secondary groups available for supplemental cross-linking.

Another example of a resin composition is disclosed in U.S. Pat. No. 6,451,930. The '930 patent discloses a resin composition that includes two distinct components. The first component is as a polyester polymer having a carbamate group and the second component is an oxyalkylsilyl monomer containing a silyl group. The first component does not include primary carbamate groups that are available for cross-linking, nor does the second component include terminal isocyanate groups available for reacting with the unreacted hydroxyl groups of the first component. Therefore, like the resin composition described above, this resin composition does not have the capability of increased cross-linking.

Accordingly, it would be advantageous to provide a resin composition that has increased cross-linking capability for use in a coating composition. The increased cross-linking capability of the coating composition would allow for linking with various cross-linkers, which when applied to a substrate produces a film having improved physical properties.

SUMMARY OF THE INVENTION

A polyester resin composition is disclosed. The resin composition of the subject invention is utilized in a coating composition and exhibits improved scratch and mar characteristics. This resin composition is the reaction product of a first compound, a carbamate compound, and a silyl compound. The first compound has a plurality of hydroxyl groups and the carbamate compound is reactive with the hydroxyl groups of the first compound. Further, the carbamate compound is added in an amount sufficient to form a carbamated intermediary. The carbamated intermediary has at least one primary carbamate group available for cross-linking and has unreacted hydroxyl groups. The silyl compound, which has a terminal isocyanate group, reacts with the unreacted hydroxyl groups of the carbamated intermediary to form the resin composition. The silyl compound also includes silylalkoxy groups which, after the terminal isocyanate group has reacted with the unreacted hydroxyl groups, are available for secondary cross-linking.

A method of preparing the polyester resin composition is also disclosed. According to this method, the hydroxyl groups of the first compound are reacted with the carbamate compound to form the carbamated intermediary. The carbamated intermediary has unreacted hydroxyl groups which are further reacted with the silyl compound to form the resin composition having available carbamate groups for cross-linking and available silylalkoxy groups for secondary cross-linking.

The general object of the subject invention is to develop a polyester resin composition for use in a coating composition to produce films that have improved scratch and mar characteristics. Without intending to be bound by theory, it is believed that the improved results are obtained because the resin composition has an increased cross-linking capability due to the carbamate groups from the carbamated polyester and due to the silylalkoxy groups from the silyl compound. The primary carbamate group is available for cross-linking and the silylalkoxy groups are available for secondary cross-linking. It is this cross-linking which provides the improved scratch and mar characteristics in the films of the coating composition. Further, the silyl compound reduces the viscosity and surface tension of the resin composition, while also using less solvent to reduce the viscosity for application of the coating composition.

DETAILED DESCRIPTION OF THE INVENTION

The general object of the subject invention is to develop a polyester resin composition for use in a coating composition. The resin composition has increased cross-linking capability, which when reacted with a cross-linker and applied to a substrate as a film, has improved scratch and mar characteristics. Without intending to be bound by theory, it is believed that the improved results are obtained when the resin composition has an increased cross-linking capability. In the subject invention, terminal carbamate groups are available for cross-linking and silylalkoxy groups are available for secondary cross-linking. It is this cross-linking which provides the improved scratch and mar characteristics of the film.

The resin composition of the subject invention, a polyester polycarbamate, is utilized in coating compositions and results in improved scratch and mar characteristics. The polyester resin composition of the present invention, also referred to in the art as a star polyester polymer, is used in a coating composition, preferably in conjunction with a suitable cross-linking agent, to produce a film for coating a substrate, such as the body panels of a vehicle and the like. The resin composition includes a branched organic structure having various functionalities including, but not limited to, branched hydrocarbon functionality, hydroxyl functionality, carboxylate functionality, carbamate functionality, and ester functionality.

In a first embodiment, the resin composition is generally the reaction product of a first compound having a plurality of hydroxyl groups, a primary carbamate compound, and a silyl compound having a terminal group reactive with hydroxyl groups and also having silylalkoxy groups. In a second embodiment, the resin composition is more specifically the reaction product of the first compound having the plurality of hydroxyl groups, a carboxylic acid anhydride, a second compound having at least one epoxy group, the carbamate compound, and the silyl compound having the terminal group reactive with hydroxyl groups and having silylalkoxy groups. In both embodiments, the first compound is a branched compound having a plurality of hydroxyl groups, however, the first compound may remain unreacted or reacted prior to carbamation, as will be described more below.

In the first embodiment, the method of preparing the resin composition includes the steps of providing the branched compound having the plurality of hydroxyl groups and reacting the hydroxyl groups of the branched compound with the carbamate compound to form a carbamated intermediary. The carbamated intermediary has at least one primary carbamate group that is available for cross-linking and has unreacted hydroxyl groups. The primary carbamate group results from the reaction of the carbamate compound with the first compound. The unreacted hydroxyl group results from the plurality of hydroxyl groups of the first compound. The unreacted hydroxyl groups are then reacted with the terminal group of the silyl compound, which is preferably a terminal isocyanate group. This allows the silylalkoxy groups of the silyl compound to be available for secondary cross-linking. The method steps of the first embodiment are preferably conducted at temperatures between 50° C. and 200° C., more preferably between 100° C. and 175° C. This method will be described in further detail below.

In the second embodiment, the method of preparing the resin composition includes the steps of providing the branched compound having the plurality of hydroxyl groups, reacting the hydroxyl groups of the branched compound with the carboxylic acid anhydride to form a first intermediate compound having a plurality of carboxylic acid groups and may be, unreacted hydroxyl groups, and then reacting at least one of the carboxylic acid groups of the first intermediate compound with the epoxy group of the second compound to form a second intermediate compound having at least one hydroxyl group. The at least one hydroxyl group of the second intermediate compound is then reacted with the carbamate compound, which results in the primary carbamate groups, which are for cross-linking. Next, all of the unreacted hydroxyl groups of this carbamated intermediate are reacted with the terminal isocyanate group of the silyl compound to prepare the resin composition. The silyl compound includes silylalkoxy groups for secondary cross-linking. Like the first embodiment, the method steps for the second embodiment are preferably conducted at temperatures between 50° C. and 200° C., more preferably between 100° C. and 175° C. This method will be described in further detail below.

To prepare the polyester resin composition, the first compound is selected to maximize the number of hydroxyl groups, i.e., the hydroxyl functionality, in the first compound while establishing a foundation for the branched organic structure of the resin composition. As such, the first compound may alternatively be described as a branched compound having a plurality of hydroxyl groups. The hydroxyl groups of the first compound can be primary, secondary, and tertiary hydroxyl groups. Preferably, the first compound is present in the resin composition in an amount from 1 to 50, more preferably from 10 to 30, parts by weight based on 100 parts by weight of the resin composition.

The first compound is more specifically selected from the group consisting of erythritol, pentaerythritol, dipentaerythritol, glycerol, trimethylolethane, trimethylolpropane, dulcitol, threitol, and mixtures thereof. As understood by those skilled in the art, trimethylolethane and trimethylolpropane each provide three hydroxyl groups, erythritol, pentaerythritol and threitol each provide four hydroxyl groups, and dipentaerythritol and dulcitol each provide six hydroxyl groups. In the preferred embodiment of the subject invention, the first compound comprises pentaerythritol. For descriptive purposes, a chemical representation of pentaerythritol is disclosed below.

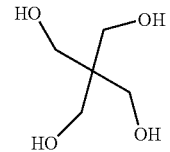

As shown above, pentaerythritol is a compound having a central carbon atom and four peripheral carbon atoms each providing a hydroxyl group for a total of four hydroxyl groups. In view of the above characteristics of the first compound, other equivalent compounds include, but are not limited to, ethylene glycol and propylene glycol, which each provide two hydroxyl groups, and glycerol, which provides three hydroxyl groups. Other alcohols, sugars, and acids providing a plurality of hydroxyl groups are also suitable as the first compound.

Next, in the first embodiment, the carbamate compound is added to the first compound. The carbamate compound is further defined as an alkyl carbamate having 1 to 20 carbon atoms in the alkyl chain. For example, the carbamate compound may be generically defined as

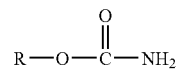

where R is an alkyl chain having from 1 to 20 carbon atoms. Preferably, the carbamate compound is selected from the group consisting of methyl carbamate, ethyl carbamate, and mixtures thereof. The most preferred carbamate compound comprises methyl carbamate [CH$_3$OC(O)NH$_2$]. Other carbamate compounds include, but are not limited to, butyl carbamate, propylene glycol monocarbamate, and the like.

The carbamate compound is present in the resin composition in an amount from 5 to 65, preferably from 20 to 60, parts by weight based on 100 parts by weight of the resin composition. The carbamate compound is added in an amount sufficient to form a carbamated intermediary having unreacted hydroxyl groups. This trans-carbamation is effected by use of a tin catalyst like dibutyltin dioxide (DBTO) and removing the alcohol byproduct that is formed. It is preferred that the first compound is carbamated to at least 75%, i.e., that three out of the four available hydroxyl groups have been reacted and therefore the carbamated intermediary has at least one unreacted hydroxyl groups. It is to be appreciated that in a mixture, there will be certain molecules that may have achieved 100% carbamation, while others will only be at 25% or less. Therefore, the 75% carbamation refers to the mixture, so long as there remain unreacted hydroxyl groups. Those skilled in the art recognize that the amount of carbamation can be determined by either titration to determine the hydroxyl number or by monitoring the amount of methanol by-product produced from the reaction. A theoretical amount of methanol by-product can be calculated for 75% carbamation and once that amount is reached, the reaction will have reached the desired carbamation.

As indicated above, the number of hydroxyl groups in the first compound functions as a foundation for the branched organic structure of the resin composition. In the preferred embodiment, the molar ratio of the carbamate compound, methyl carbamate, to the first compound, pentaerythritol, is 3:1. If the first compound is dipentaerythritol having six hydroxyl groups, then preferably five moles of the carbamate compound are utilized to prepare the completed resin composition. Of course, structures resulting from lower equivalents of the carbamate compound are not to be excluded, so long as there are plurality of carbamate groups and at least one hydroxyl group available for subsequent reaction with the silyl compound. A chemical representation of the carbamated intermediary of the first embodiment, wherein the first compound is pentaerythritol and the carbamate compound is methyl carbamate, is disclosed below.

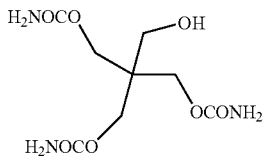

The carbamated intermediary is then reacted with a silyl compound having the terminal group. The terminal group is preferably an isocyanate group, however, other groups may be used that are reactive with hydroxyl groups. The terminal group should be more reactive than the silylalkoxy groups with the hydroxyl groups to ensure that the silylalkoxy groups are intact at the end of the reaction. Preferably, the silyl compound is an isocyanatoalkylalkoxysilane and is more preferably selected from the group consisting of isocyanatopropyltrimethoxysilane, isocyanatopropylmethyldimethoxysilane, isocyanatopropylmethyldiethoxysilane, isocyanatepropyltriethoxysilane, isocyanatoneohexyltrimethoxysilane, isocyanate-neohexyldimethoxysilane, isocyanatoneohexydiethoxysilane, isocyanatoneo-hexyltriethoxysilane, isocyanatoisoamyltrimethoxysilane, isocyanatoisoamyl-dimethoxysilane, isocyanatoisoamylmethyldiethoxysilane, isocyanatoisoamyltri-ethoxysilane, and mixtures thereof. One example of the silyl compound is commercially available from Crompton Corp. as SILQUEST® A-Link 25 or SILQUEST® A-Link 35. It is believed that the terminal isocyanate component of the silyl compound reacts with the unreacted hydroxyl groups of the carbamated intermediary, because the hydroxyl groups are much more reactive than the carbamate groups toward the isocyanate. However, it is to be appreciated that in the mixture, and under particular reaction circumstances, while not preferred, the isocyanate groups may react with the carbamate groups. The reaction of the silylalkoxy groups with the hydroxyl group may occur but the experimental conditions were chosen such that the isocyanate group will react with the hydroxyl groups more readily over that of silylalkoxy reaction with the hydroxyls. The silyl compound also reduces the viscosity and surface tension of the resin composition, while also allowing for a higher solids content to be obtained for the resin composition. Reduced viscosity of the resin composition means that less solvent is required to lower an application viscosity of a coating composition that incorporates the resin composition and this is, therefore, more environmentally friendly.

The silyl compound is present in the resin composition in an amount from 1 to 70, preferably from 15 to 50, parts by weight based on 100 parts by weight of the resin composition. A chemical representation of the resin composition of the first embodiment is disclosed below where the silyl compound is isocyanatopropyltrimethoxysilane.

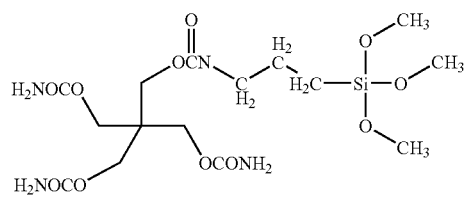

In the second embodiment, the first compound is first reacted with the carboxylic acid anhydride prior to adding the carbamate compound. The carboxylic acid anhydride may be either an aromatic or non-aromatic cyclic anhydride. The carboxylic acid anhydride is preferably selected from, but not limited to, the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof. In the preferred embodiment of the subject invention, the carboxylic acid anhydride comprises hexahydrophthalic anhydride. For descriptive purposes, a chemical representation of hexahydrophthalic anhydride is disclosed below.

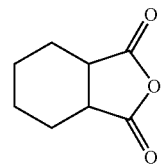

As shown above, the hexahydrophthalic anhydride provides an acid functionality whereby one carboxylic acid group can be formed into the intermediate compound per mole of the carboxylic acid anhydride introduced.

The carboxylic acid anhydride is present in the resin composition in an amount from 10 to 40, preferably from 23 to 37, parts by weight based on 100 parts by weight of the resin composition. More specifically, in the preferred embodiment, the molar ratio of the carboxylic acid anhydride, hexahydrophthalic anhydride, that is reacted with the first compound, pentaerythritol, is 3:1. That is, three moles of hexahydrophthalic anhydride are reacted with one mole of pentaerythritol to form the first intermediate compound. For descriptive purposes, a chemical representation of the first intermediate compound formed by the reaction of one mole pentaerythritol and three moles of hexahydrophthalic anhydride according to the second embodiment is disclosed below.

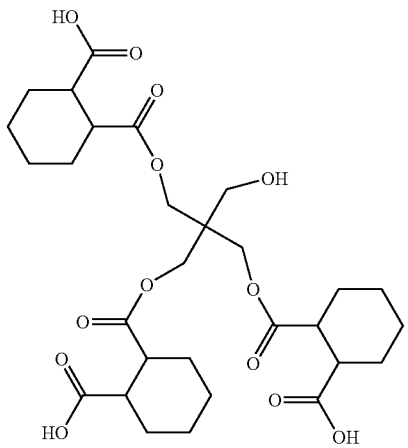

As shown above, the first intermediate compound that is formed with the reactants of the preferred embodiment is a tricarboxylic acid compound, i.e., a compound including three carboxylic acid groups or an acid functionality of three. These three carboxylic acid groups of the first intermediate compound are formed when the anhydride rings of the three moles of hexahydrophthalic anhydride open forming ester linkages with the pentaerythritol, and the hydrogen atoms from the three hydroxyl groups of the pentaerythritol react with the oxygen atoms originally from the anhydride rings of the three moles of hexahydrophthalic anhydride thereby forming the tricarboxylic acid intermediate compound according to the preferred embodiment. As stated above, the intermediate compound of the preferred embodiment has an acid functionality of three. Of course, it is to be understood that the acid functionality can decrease or increase depending upon the selection of the particular first compound and of the particular carboxylic acid anhydride, and upon the equivalent weight ratios between the first compound and the carboxylic anhydride. It is preferred to have unreacted hydroxyl groups remaining from the first compound for reacting with the silyl compound to increase the cross-linking capability of the compound and reduce the equivalent weight of the resin.

The chemical representation of the first intermediate compound disclosed above is merely illustrative of the subject invention. The intermediate compound disclosed above has a four-branch organic structure originally derived from the organic structure of the pentaerythritol. It is to be understood that if an alternative first compound is selected, such as dipentaerythritol which, as discussed above, provides six hydroxyl groups, then the intermediate compound would have a six-branch organic structure derived from the structure of the dipentaerythritol. Of course, five moles of hexahydrophthalic anhydride then would be selected to react with five of the six hydroxyl groups of the dipentaerythritol.

Continuing with the preparation of the resin composition according to the second embodiment, at least one of the carboxylic acid groups of the first intermediate compound is reacted with the second compound to form the second intermediate compound having the at least one hydroxyl group. More specifically, it is the epoxy group of the second compound that reacts with at least one of the carboxylic acid groups of the first intermediate compound to form the second intermediate compound having the at least one hydroxyl group. Preferably, all of the carboxylic acid groups of the first intermediate compound are reacted with the second compound such that the second intermediate compound is formed with a plurality of hydroxyl groups.

The second compound is selected to include at least one epoxy group, and is present in the resin composition in an amount from 20 to 70, preferably from 30 to 60, parts by weight based on 100 parts by weight of the resin composition. The second compound is further selected to include from 6 to 20, preferably from 10 to 15, carbon atoms. As such, the second compound is selected from the group consisting of glycidylneodecanoate, dodecyl oxide, tetradecyl oxide, octadecyl oxide, and cyclohexene oxide, and mixtures thereof. In view of the above characteristics of the second compound, other equivalent compounds include, but are not limited to, epoxy-containing aromatic hydrocarbons such as bisphenol A monoglycidyl ether.

In the preferred embodiment of the subject invention, the second compound comprises glycidylneodecanoate. As is known in the art, glycidylneodecanoate is commercially available from Miller-Stephenson Chemical Company, Inc. under its CARDURA® product line, as CARDURA E 10P. For descriptive purposes, a chemical representation of glycidylneodecanoate is disclosed below.

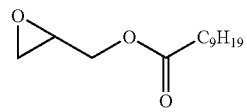

As shown above, glycidylneodecanoate includes one epoxy group. Preferably, three moles of glycidylneodecanoate are reacted with the three carboxylic acid groups of the first intermediate compound such that one epoxy group reacts with each carboxylic acid group. As described above, it is the epoxy group of the second compound that reacts with at least one of the carboxylic acid groups of the first intermediate compound. More specifically, the epoxy ring of the glycidylneodecanoate opens such that one of the two carbon atoms, originally in the epoxy ring of the glycidylneodecanoate, reacts and bonds with an oxygen atom from one of the hydroxyls of the carboxylic acid groups of the first intermediate compound. It is to be understood by those skilled in the art that in the reaction, the epoxy ring can open in one of two manners such that either one of the carbon atoms of the epoxy ring reacts and bonds with the oxygen atom from the hydroxyl of the carboxylic acid group. The resultant second intermediate compound includes either a primary hydroxyl or a secondary hydroxyl. For simplicity, only the second intermediate compound with primary hydroxyl groups is disclosed, but it is to be appreciated that one skilled in the art would recognize the second intermediate compound with secondary hydroxyl groups.

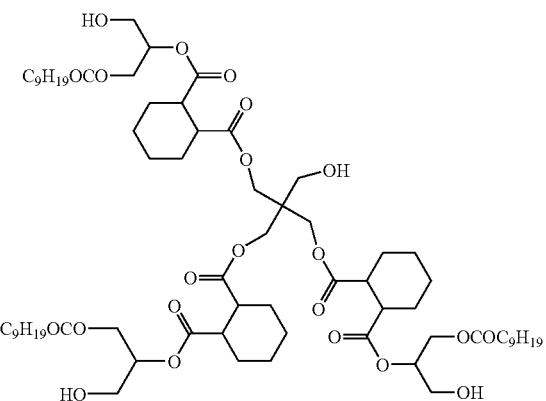

Next, in the second embodiment, the hydroxyl groups of the second intermediate compound are reacted with the carbamate compound in amounts sufficient to carbamate the second intermediate compound, as described above. Those skilled in the art will appreciate that in the mixture some of the unreacted hydroxyls may react with the carbamate compound. A chemical representation of the carbamated intermediary of the second embodiment is disclosed below, wherein only the primary hydroxyls from the reaction of carboxylic acids with the epoxide are transcrabamated. However, those skilled in the art will recognize that one cannot distinguish between these and the unsubstituted primary hydroxyl from the starting first compound. Also, some of the secondary hydroxyls present will also be transcarbamated, even though kinetically these are expected to be slower.

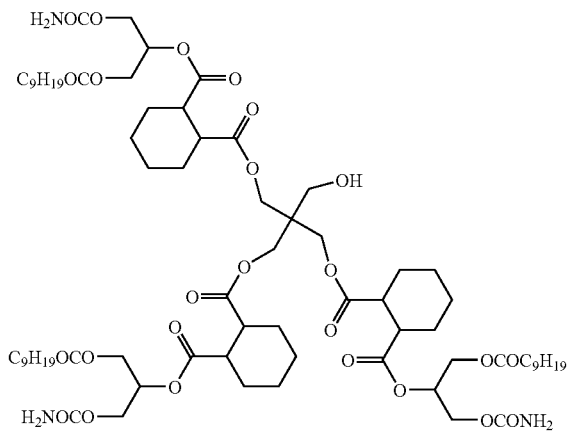

As shown above in the carbamated intermediary, the carbamate compound, methyl carbamate, has reacted with the primary hydroxyls of the second intermediate compound that result from the particular manner of epoxy ring opening of the glycidylneodecanoate. As such, primary carbamate groups are present. Of course, in terms of the second embodiment, during the three moles of methyl carbamate react with the hydroxyl groups of the second intermediate compound (catalyzed by Tin compounds) to prepare the resin composition, three moles of methanol are produced as a side product. The number of moles of alcohol that are produced as a side product vary depending on the number of moles of the carbamate compound, preferably the methyl carbamate, that are reacted with the second intermediate compound. It is to be appreciated that the carbamate compound can also react with the secondary hydroxyls of the second intermediate compound that result from a second manner of epoxy ring opening of the glycidylneodecanoate, if present.

Next, the carbamated intermediary is then reacted with the silyl compound having the terminal isocyanate group, as described above. A chemical representation of the resin composition of the second embodiment is disclosed below where the silyl compound is isocyanatopropyltriethoxysilane.

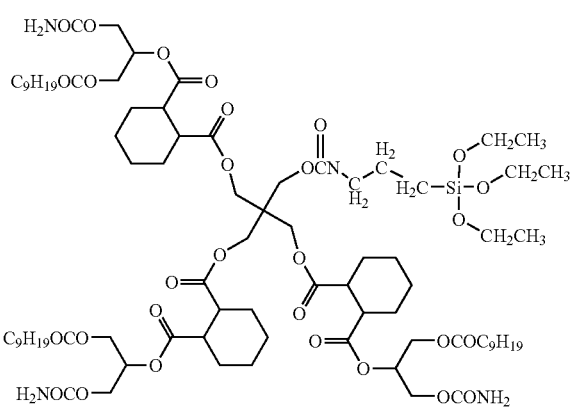

As shown above in either of the embodiments, the resin composition is a polyester polycarbamate, preferably a polyester tricarbamate, having a four-branch organic structure.

The resin composition of the subject invention has a number-average molecular weight, $M_n$, of 4000 or less. Preferably, the molecular weight is from 1250 to 3000, and more preferably, from 1300 to 2500. Additionally, the resin composition of the subject invention has a non-volatile content of from 50 to 90, preferably from 60 to 75, percent non-volatile by weight. The resin composition also has a polydispersity of 1 to 2 and preferably from about 1.01 to 1.5.

It is to be understood that all of the preceding chemical representations are merely two-dimensional chemical representations and that the structure of these chemical representations may be other than as indicated. Further, the intermediates illustrated are but one of many different intermediates that may result and the invention is not necessarily limited to the reactions with such intermediates. The following examples illustrate the formation of the resin composition of the subject invention, as presented herein, and are intended to illustrate and not limit the subject invention.

EXAMPLES

Examples 1 through 3 illustrate the formation of the resin composition according to the subject invention. Example 1 is formed according to the first embodiment and Examples 2 and 3 are formed according to the second embodiment. The resin composition was prepared by adding and reacting the following parts listed in Tables 1–3, by weight, unless otherwise indicated. Specifically, Table 1 lists the first compound in Example 1 and the formation of a polyester in Examples 2 and 3 for use in the subject invention.

TABLE 1

| Reactant | Example 1 | | Example 2 | | Example 3 | |
|---|---|---|---|---|---|---|
| | Amount (grams) | Weight % | Amount (grams) | Weight % | Amount (grams) | Weight % |
| First Compound | 136.0 | 100.0 | 720.0 | 9.2 | 746.0 | 9.5 |
| Second Compound | 0.0 | 0.0 | 4432.0 | 56.2 | 4390.0 | 56.0 |
| Carboxylic Acid Anhydride | 0.0 | 0.0 | 2730.0 | 34.6 | 2704.0 | 34.5 |
| TOTAL | 136.0 | 100.0 | 7882.0 | 100.0 | 7840.0 | 100.0 |

The first compound is pentaerythritol (PE), the second compound is glycidylneodecanoate, commercially available as CARDURA E 10P, and the carboxylic acid anhydride is hexahydrophthalic anhydride (HHPA). In Example 1, 136 grams of PE are used.

In Example 2, 2730.0 grams of HHPA were added in a reaction flask to 720.0 grams of PE, i.e., the branched compound, to form the first intermediate compound. The reaction flask, including the PE and HHPA, was heated with a conventional heat supply to a temperature of 120° C. to 125° C. An exotherm was observed which was maintained below 145° C., by use of xylene as a solvent and cooling. After this exotherm, the batch was allowed to cool and was maintained at 135–140° C. for approximately one hour. Standard titration for acid number revealed that the reaction to form the first intermediate compound was complete (200 to 220 mg KOH/gram). The completeness of the reaction between the PE and HHPA was also monitored with IR Spectroscopy noting the absence of an anhydride peak. The reaction mixture was cooled to 120° C. and 4432.0 grams of CARDURA E 10S were added to the first intermediate compound to form a second intermediate compound. Another exotherm was observed, which was controlled below 140° C. by metered addition of CARDURA E 10S and cooling. After the addition, the reaction was maintained between 135–140° C. until standard titration for acid number revealed that the reaction to form the second intermediate compound was complete (<3 mg KOH/gram). The completeness of this reaction was also monitored with IR Spectroscopy noting the absence of an epoxide peak. The second intermediate compound had a hydroxyl number of 160 to 175 mg KOH/gram/solids.

In Example 3, 2704.0 grams of HHPA were added in a reaction flask to 746.0 grams of PE, i.e., the branched compound, to form the first intermediate compound. The reaction flask, including the PE and HHPA, was heated with a conventional heat supply to a temperature of 120° C. to 125° C. An exotherm was observed which was controlled to below 145° C., by use of xylene as solvent and cooling. After this exotherm, the batch was allowed to cool and was maintained between 135–140° C. for approximately one hour. Standard titration for acid number revealed that the reaction to form the first intermediate compound was complete (200 to 220 mg KOH/gram). The completeness of the reaction between the PE and HHPA was also monitored with IR Spectroscopy noting the absence of an anhydride peak. The reaction mixture was cooled to 120° C. and 4390.0 grams of CARDURA E 10P were added in small portions to the first intermediate compound to form a second intermediate compound. Another exotherm was observed, which was controlled below 140° C. by cooling and proper metering of the CARDURA E10S. After the addition, the reaction was maintained at 135–140° C. until standard titration for acid number revealed that the reaction to form the second intermediate compound was complete (<3 mg KOH/gram). The completeness of this reaction was also monitored with IR Spectroscopy noting the absence of an epoxide peak. The second intermediate compound had a hydroxyl number of 160 to 175 mg KOH/gram/solids.

The first compound of Example 1 and the second intermediate compound from Examples 2 and 3 were then reacted with a carbamate compound to form a carbamated intermediary, as set forth in Table 2.

TABLE 2

| Reactant | Example 1 | | Example 2 | | Example 3 | |
|---|---|---|---|---|---|---|
| | Amount (grams) | Weight % | Amount (grams) | Weight % | Amount (grams) | Weight % |
| First Compound | 136.0 | 37.2 | 0.0 | 0.0 | 0.0 | 0.0 |
| Second Intermediate Compound | 0.0 | 0.0 | 897.6 | 84.5 | 2324.0 | 84.4 |
| Carbamate Compound | 230.0 | 62.8 | 165.0 | 15.5 | 430 | 15.6 |
| TOTAL | 366.0 | 100.0 | 1062.6 | 100.0 | 2754.0 | 100.0 |

The carbamate compound is methyl carbamate. In Example 1, 150 grams each of toluene and xylene (solvents) were added in a reaction flask to the 136 grams of pentaerythritol. Next, 230 grams of methyl carbamate were added to the reaction flask along with 0.3 grams of dibutyl tin oxide (DBTO), the catalyst. Standard titration for hydroxyl number revealed that the initial mixture had a hydroxyl number of 167.4 mg KOH/g. The reaction flask was heated with a conventional heat supply to a temperature of 123° C. The amount of methyl carbamate added was just enough to trans-carbamate 3 equivalents of hydroxyl groups. The batch was maintained between 120–125° C. and the reaction was stopped when the amount of the methanol by-product collected was equal to the theoretical amount to achieve 75% carbamation. The amount of carbamation was determined by measuring the methanol by-product because the tricarbamate of pentaerythritol is not very soluble in xylene and precipitates out making the determination of hydroxyl number difficult. Excess methyl carbamate was removed by vacuum distillation. Additional solvent was added in an amount of 50 g of methylpropyl ketone.

In Example 2, 897.6 grams of the second intermediate compound (from Table 1) were mixed with 165.0 grams of methyl carbamate and 1.4 grams of dibutyl tin oxide (DBTO) in 200 grams of toluene. The mixture was heated with a conventional heat supply to a temperature of 120° C. to 125° C., such that carbamation took place with the azeotropic removal of methanol as the side product. The reaction was continued until the hydroxyl number was determined to be 25.6 mg KOH/g/NV by titration to form the carbamated intermediary. This corresponds to 85% of the hydroxyl groups being trans carbamated. Excess methyl carbamate was removed by vacuum distillation. Next, the carbamated intermediary was dissolved in 104 grams of a solvent, Solvesso 100 to a final non-volatile (NV) of 89% by weight.

In Example 3, 2324.0 grams of the second intermediate compound (from Table 1) were mixed with 430.0 grams of methyl carbamate and 4.8 grams of DBTO in 109.6 grams of toluene. The mixture was heated with a conventional heat supply to a temperature of 120° C. to 125° C., such that carbamation took place with the azeotropic removal of methanol as the side product. The reaction continued until the hydroxyl number was determined to be 26.2 mg KOH/g/NV by titration to form the carbamated intermediary. This results in 84% of the hydroxyls being trans carbamated. Excess methyl carbamate was then removed by vacuum distillation. Next, the carbamated intermediary was dissolved in 700 grams of a solvent, Solvesso 100, to a final non-volatile (NV) of 73.9% by weight.

Next, the resin composition was prepared by adding and reacting the carbamated intermediaries from Table 2 with the silyl compound as listed in Table 3 below.

TABLE 3

| Reactant | Example 1 | | Example 2 | | Example 3 | |
|---|---|---|---|---|---|---|
| | Amount (grams) | Weight % | Amount (grams) | Weight % | Amount (grams) | Weight % |
| Carbamated Intermediary | 85.0 | 56.1 | 850 | 90.8 | 1450.0 | 93.3 |
| Silyl Compound A | 66.5 | 43.9 | 86.8 | 9.2 | — | — |
| Silyl Compound B | — | — | — | — | 103.0 | 6.7 |
| TOTAL | 151.5 | 100.0 | 936.8 | 100.0 | 1553 | 100.0 |

Silyl compound A is 3-isocyanatopropyltriethoxysilane and silyl compound B is 3-isocyanatopropyltrimethoxysilane. In Example 1, 66.5 grams of the silyl compound A were added in the reaction flask to 85 grams of the carbamated intermediary (from Table 2). The reaction flask was heated with a conventional heat supply to a temperature of 106° C. It is desired to continue the reaction until all of the isocyanate groups present from the silyl compound have reacted with the hydroxyl groups of the carbamated intermediary. The resultant resin composition had 0% isocyanate groups, a non-volatile content of 65.2%, and an equivalent weight of 170 g/carbamate and 170 g/ethoxy (from triethoxysilyl group). The resultant resin composition has a theoretical weight-average molecular weight of 470 and a poly-dispersity of from 1.01–1.1.

In Example 2, 86.8 grams of the silyl compound A were added in the reaction flask to 850 grams of the carbamated intermediary (from Table 2). The reaction flask was heated with a conventional heat supply to a temperature of 82° C. It is desired to continue the reaction until all of the isocyanate groups present from the silyl compound have reacted with the hydroxyl groups of the carbamated intermediary. The resultant resin composition had 0% isocyanate groups, a number-average molecular weight of 2115, a polydispersity of 1.6, a non-volatile content of 71%, and an equivalent weight of 470 g/carbamate and 888 g/ethoxy (from triethoxy silyl group).

In Example 3, 103.0 grams of the silyl compound A were added in the reaction flask to 1450.0 grams of the carbamated intermediary (from Table 2). The reaction flask was heated with a conventional heat supply to a temperature of 76° C. It is desired to continue the reaction until all of the isocyanate groups present from the silyl compound have reacted with the hydroxyl groups of the carbamated intermediary. The resultant resin composition had 0% isocyanate groups, a number-average molecular weight of 1778, a polydispersity of 1.03, a non-volatile content of 69.7%, and an equivalent weight of 468 g/carbamate and 884 g/methoxy (from trimethoxysilyl group).

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A polyester resin composition having increased cross-linking capability for use in a coating composition, said resin composition comprising the reaction product of:
   a first compound having a plurality of hydroxyl groups;
   a carbamate compound reactive with said hydroxyl groups of said first compound and added in an amount sufficient to form a carbamated intermediary having at least one primary carbamate group available for cross-linking and having unreacted hydroxyl groups; and
   a silyl compound having a terminal isocyanate group reactive with said unreacted hydroxyl groups of said carbamated intermediary and having silylalkoxy groups that are available for secondary cross-linking after said terminal isocyanate group reacts with said unreacted hydroxyl groups.

2. A polyester resin composition as set forth in claim 1 wherein said silyl compound is further defined as an isocyanatoalkylalkoxysilane.

3. A polyester resin composition as set forth in claim 1 wherein said first compound is selected from the group consisting of erythritol, pentaerythritol, dipentaerythritol, glycerol, trimethylolethane, trimethylolpropane, dulcitol, threitol, and mixtures thereof.

4. A polyester resin composition as set forth in claim 1 wherein said carbamate compound is further defined as an alkyl carbamate having 1 to 20 carbon atoms in the alkyl chain.

5. A polyester resin composition as set forth in claim 1 wherein said silyl compound is selected from the group consisting of isocyanatopropyltrimethoxysilane, isocyanatopropylmethyldimethoxysilane, isocyanatopropylmethyldiethoxysilane, iso-cyanatopropyltriethoxysilane, isocyanatoneohexyltrimethoxysilane, isocyanate-neohexyldimethoxysilane, isocyanatoneohexydiethoxysilane, isocyanatoneo-hexyltriethoxysilane, isocyanatoisoamyltrimethoxysilane, isocyanatoisoamyl-dimethoxysilane, isocyanateisoamylmethyldiethoxysilane, isocyanatoisoamyltri-ethoxysilane, and mixtures thereof.

6. A polyester resin composition as set forth in claim 1 having a polydispersity of from about 1 to about 2.

7. A polyester resin composition as set forth in claim 1 having a number-average molecular weight of less than 4000.

8. A polyester resin composition as set forth in claim 1 having a non-volatile content of from 50 to 90.

9. A polyester resin composition as set forth in claim 1 wherein said first compound is present in an amount of from 1 to 50 parts by weight based on 100 parts by weight of said polyester resin composition.

10. A polyester resin composition as set forth in claim 1 wherein said amount of said carbamate compound is from 5 to 65 parts by weight based on 100 parts by weight of said polyester resin composition.

11. A polyester resin composition as set forth in claim 1 wherein said silyl compound is present in an amount of from 1 to 70 parts by weight based on 100 parts by weight of said polyester resin composition.

12. A polyester resin composition as set forth in claim 1 further comprising a carboxylic acid anhydride reactive with said hydroxyl groups of said first compound.

13. A polyester resin composition as set forth in claim 12 further comprising a second compound having at least one epoxy group reactive with said carboxylic acid anhydride.

14. A polyester resin composition having increased cross-linking capability for use in a coating composition, said resin composition comprising the reaction product of:
  a first compound having a plurality of hydroxyl groups;
  a carboxylic acid anhydride reactive with said hydroxyl groups of said first compound and added in an amount sufficient to form a first intermediate compound having at least one carboxylic acid group and unreacted hydroxyl groups;
  a second compound having at least one epoxy group reactive with said carboxylic acid group to form a second intermediate compound having unreacted hydroxyl groups;
  a carbamate compound reactive wit said unreacted hydroxyl groups of said second intermediate compound to form a carbamated intermediary having at least one primary carbamate group available for cross-linking and having unreacted hydroxyl groups; and
  a silyl compound having a terminal group reactive with said unreacted hydroxyl groups and having silylalkoxy groups such that said silylalkoxy groups are available for secondary cross-linking after said terminal group reacts with said unreacted hydroxyl groups.

15. A polyester resin composition as set forth in claim 14 wherein said first compound comprises pentaerythritol.

16. A polyester resin composition as set forth in claim 15 wherein said carboxylic acid anhydride comprises hexahydrophthalic anhydride.

17. A polyester resin composition as set forth in claim 16 wherein said second compound comprises glycidylneodecanoate.

18. A polyester resin composition as set forth in claim 17 wherein said carbamate compound comprises methyl carbamate.

19. A polyester resin composition as set forth in claim 18 wherein said silyl compound comprises an isocyanatoalkylalkoxysilane.

20. A polyester resin composition as set forth in claim 14 wherein said first compound is selected from the group consisting of erythritol, pentaerythritol, dipentaerythritol, glycerol, trimethylolethane, trimethylolpropane, dulcitol, threitol, and mixtures thereof.

21. A polyester resin composition as set forth in claim 14 wherein said second compound is selected from the group consisting of glycidylneodecanoate, dodecyl oxide, tetradecyl oxide, octadecyl oxide, and cyclohexene oxide, and mixtures thereof.

22. A polyester resin composition as set forth in claim 14 wherein said carboxylic acid anhydride is selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof.

23. A polyester resin composition as set forth in claim 14 wherein said carbamate compound is further defined as an alkyl carbamate having 1 to 20 carbon atoms in the alkyl chain.

24. A polyester resin composition as set forth in claim 14 wherein said carbamate compound is selected from the group consisting of methyl carbamate, ethyl carbamate, and mixtures thereof.

25. A polyester resin composition as set forth in claim 14 wherein said silyl compound is selected from the group consisting of isocyanatopropyltrimethoxysilane, iso-cyanatepropylmethyldimethoxysilane, isocyanatopropylmethyldiethoxysilane, isocyanate-propyltriethoxysilane, isocyanatoneohexyltrimethoxysilane, isocyanateneohexyldimethoxysilane, isocyanatoneohexydiethoxysilane, isocyanatoneohexyl-triethoxysilane, isocyanateisoamyltrimethoxysilane, isocyanatoisoamyldimethoxysilane, isocyanatoisoamylmethyldiethoxysilane, isocyanatoisoamyltriethoxysilane, and mixtures thereof.

26. A polyester resin composition as set forth in claim 14 having a polydispersity of from about 1 to about 2.

27. A polyester resin composition as set forth in claim 14 having a number average molecular weight of less than 4000.

28. A polyester resin composition as set forth in claim 14 having a non-volatile content of from 50 to 90.

29. A polyester resin composition as set forth in claim 14 wherein said first compound is present in an amount from 1 to 50 parts by weight based on 100 parts by weight of said polyester resin composition.

30. A polyester resin composition as set forth in claim 14 wherein said carboxylic acid anhydride is present in an amount from 10 to 40 parts by weight based on 100 parts by weight of said polyester resin composition.

31. A polyester resin composition as set forth in claim 14 wherein said second compound is present in an amount from 20 to 70 parts by weight based on 100 parts by weight of said polyester resin composition.

32. A polyester resin composition as set forth in claim 14 wherein said amount of said carbamate compound is from 5 to 65 parts by weight based on 100 parts by weight of said polyester resin composition.

33. A polyester resin composition as set forth in claim 14 wherein said silyl compound is added in an amount of from 1 to 70 parts by weight based on 100 parts by weight of said polyester resin composition.

34. A method of preparing a polyester resin composition for use in a coating composition, said method comprising the steps of:
  (A) providing a branched compound having a plurality of hydroxyl groups;
  (B) reacting a carbamate compound with the hydroxyl groups of the branched compound in an amount sufficient to form a carbamated intermediary having at least one primary carbamate group available for cross-linking and having unreacted hydroxyl groups;
  (C) reacting a silyl compound, having a terminal group and silylalkoxy groups, with the unreacted hydroxyl groups of the carbamated intermediary such that the terminal groups react with the unreacted hydroxyl groups to form the resin composition having silylalkoxy groups available for secondary cross-linking.

35. A method as set forth in claim 34 wherein the step of (A) providing the branched compound is further defined as providing a first compound selected from the group consisting of erythritol, pentaerythritol, dipentaerythritol, glycerol, trimethylolethane, trimethylolpropane, dulcitol, threitol, and mixtures thereof.

36. A method as set forth in claim 34 further comprising the step of reacting the hydroxyl groups of the branched compound with a carboxylic acid anhydride selected from the group consisting of maleic anhydride, hexahydrophthalic anhydride, methyl-hexahydrophthalic anhydride, tetrahydrophthalic anhydride, phthalic anhydride, succinic anhydride, dodecenylsuccinic anhydride, trimellitic anhydride, and mixtures thereof, to form a first intermediate compound having the plurality of carboxylic acid groups prior to reacting with the carbamate compound.

37. A method as set forth in claim 36 further comprising the step of reacting at least one of the carboxylic acid groups of the first intermediate compound with a second compound selected from the group consisting of glycidylneodecanoate, dodecyl oxide, tetradecyl oxide, octadecyl oxide, and cyclohexene oxide, and mixtures thereof, to form the second intermediate compound having the at least one hydroxyl group prior to reacting with the carbamate compound.

38. A method as set forth in claim 37 further comprising the the step of reacting the at least one hydroxyl group of the second intermediate compound with an alkyl carbamate having from 1 to 20 carbon atoms in the alkyl chain, to prepare the resin composition of step (B).

39. A method as set forth in claim 38 wherein the step of (C) reacting any remaining hydroxyl groups of the carbamated intermediary with the silyl compound is further defined as reacting any remaining hydroxyl groups of the carbamated intermediary with at least one of isocyanatopropyltrimethoxysilane, isocyanatopropyl-methyldimethoxysilane, isocyanatopropylmethyldiethoxysilane, isocyanatopropyl-triethoxysilane, isocyanatoneohexyltrimethoxysilane, isocyanatoneohexyldimethoxy-silane, isocyanatoneohexydiethoxysilane, isocyanatoneohexyltriethoxysilane, isocyanate-isoamyltrimethoxysilane, isocyanatoisoamyldimethoxysilane, isocyanatoisoamylmethyl-diethoxysilane, and isocyanatoisoamyltriethoxysilane.

40. A method as set forth in claim 34 further including the step of continuing the reaction of step (C) until less than 5% of isocyanate groups remain in the resin composition.

41. A method as set forth in claim 40 further including the step of removing excess carbamate compound that has not reacted with the hydroxyl groups.

42. A method as set forth in claim 34 wherein the steps of (A) through (C) are conducted at a temperature between 50° C. and 200° C.

* * * * *